Dec. 27, 1932. C. A. WINSLOW 1,892,443
LUBRICATING SYSTEM FOR HYDROCARBON ENGINES AND THE LIKE
Filed Feb. 14, 1927
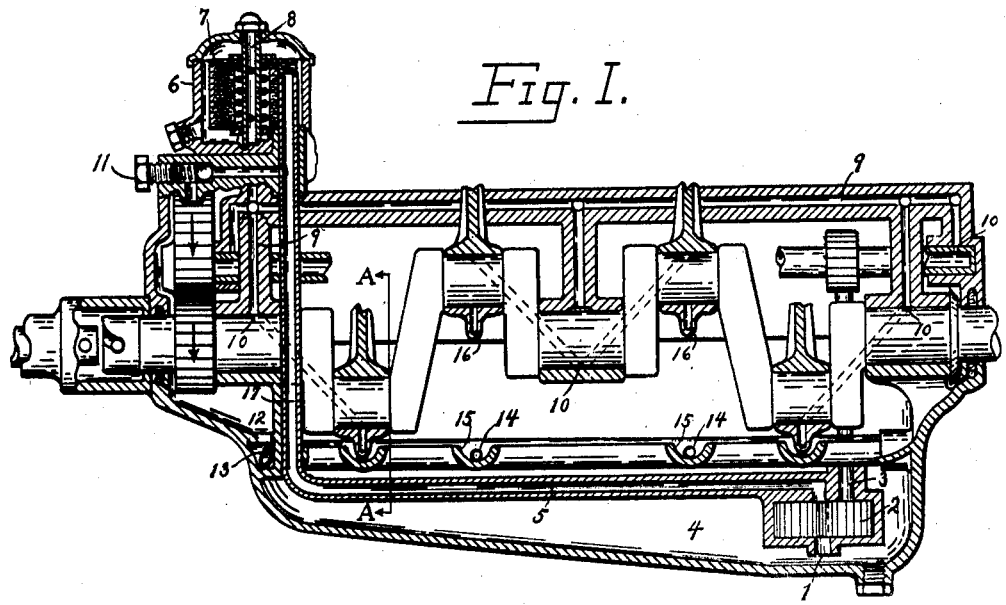
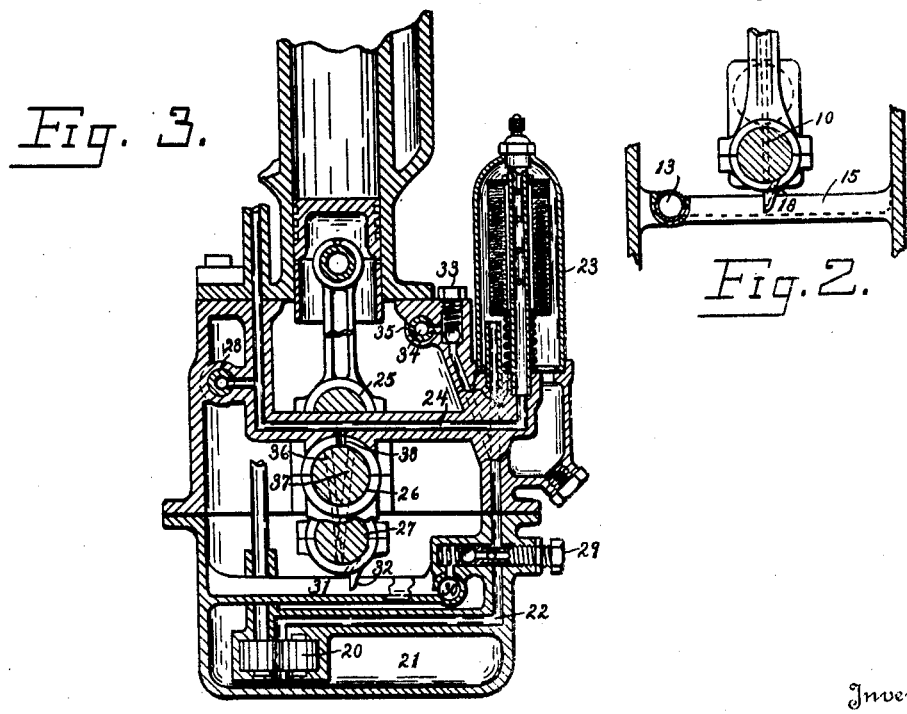
Inventor
Charles A. Winslow Patented Dec. 27, 1932

1,892,443

UNITED STATES PATENT OFFICE

CHARLES A. WINSLOW, OF VALLEJO, CALIFORNIA

LUBRICATING SYSTEM FOR HYDROCARBON ENGINES AND THE LIKE

Application filed February 14, 1927. Serial No. 168,061.

The present invention relates to lubricating systems for hydro-carbon engines, and the like, where the lubricating oil is caused to be continually cleansed and filtered during the operation of the engine, thereby preventing solid particles in the form of contamination in the oil from being pumped into the crank shaft and bearings of the engine, which causes great damage to the bearings surfaces in ordinary lubricating systems commonly used in the past.

A further object of the invention is the provision primarily of a pressure lubricating system, wherein a metered amount of lubricant is fed from the pump through a filtering medium into the crank shaft and metered through suitable orifices and passages to the unloaded side of the bearings, the lubricant to be in proportion to the revolutions of the bearings and load upon same, thus preventing over-oiling at lower speeds of the engine, and insuring a greater quantity of filtered lubricant to the bearings as either or both the speed or load of the bearings increases. The metering of the lubricant in the primary pressure system, as stated, is controlled both by the speed of the engine which governs the number of communications with the lubricant under pressure, and the load upon the bearings generated by either or both the speed or power developed by the engine acting to cause bearing clearances to be greater on the unloaded side of same, and providing more clearance for the lubricant under pressure to be distributed in the bearing during communication of metering passages with the lubricant. However, during the operation of the engines under some conditions, the pressure lubricating systems alone have been found insufficient to properly lubricate all parts of the engine, as when operated under extremely cold conditions or at extremely high speed, and the present invention relates to a secondary lubricating system in conjunction with the primary lubricating system whereby an excess of resistance in the primary lubricating system causes a secondary lubricating system to automatically operate in conjunction with the primary system, and thus insures adequate oiling of engines under all conditions of operation. In other words a filtered, metered amount of oil is always fed to the crank shaft and connecting rod bearing by the primary force feed lubricating system at all engine speeds, and additional oil is forced by a secondary splash system onto the other parts of the motor when the primary oiling system through the crank shaft, etc., is insufficient to correctly lubricate the other parts of the engine.

A still further object of the invention is the provision in a lubricating system of a means to adequately lubricate pistons, cylinders, rings, bearings, etc., and prevent crank-case dilution during the operation of an engine under extremely cold conditions and when starting a motor with cold cylinders, pistons, etc. Under these conditions crankcase dilution occurs due to the fact that conventional lubricating systems do not provide an adequate piston seal with lubricating oil and thereby allow fuel, water, etc., to drain down past the pistons into the crank-case.

Other objects and advantages will be apparent and suggest themselves as the nature of the invention is more clearly understood. While the drawing illustrates an embodiment of the invention in two forms, it is to be understood that in adapting the same to meet different conditions and requirements, various changes in the form, proportions, and minor details of construction, may be resorted to without departing from the spirit of the invention. Therefore, I do not wish to limit myself to the forms shown, which are only examples of the application of the principal of combining a metering force feed lubricating system containing a filter between the pump and bearings, and a splash system arranged to cooperatively act with the force feed system to correctly lubricate an engine during all conditions of operation.

Referring to the drawing forming part of the application, Figure 1 is a vertical section through a conventional hydrocarbon engine and illustrates a form of the invention wherein oil is pumped from the sump of the engine through a conventional gear pump, thence through a filter medium and to the bearings of the engine where the amount fed is metered by orifices and passage ways shown on the drawing and engine operating conditions. A by-pass is provided on the line between the pump and the filtering medium which operates when the pressure delivered by the pump reaches a predetermined point and causes the oil from the primary pressure lubricating system to be by-passed over the timing gears and thence down through suitable channels to a splash feed system, which operates in conjunction with the pressure system as described.

Figure 2 illustrates a partial, vertical, sectional view on the line A—A of Figure 1, and illustrates a section of the engine where the splash system cooperates with the pressure system.

Figure 3 is a vertical section through a conventional hydro-carbon engine and illustrates an embodiment of the invention wherein oil is pumped by a conventional gear pump from the oil sump of the engine through a filtering medium, thence to metering orifices in the bearings, where it is delivered to the unloaded side of the bearings as metered and filtered lubricant, and a system of by-pass arrangements wherein the oil is caused first to discharge into a splash system in the lower-most part of the engine as the speed or pressure increases, and secondary as the speed or pressure increases still further another by-pass arrangement operates wherein the oil is delivered directly to the bearing surfaces of the engine in the upper-most part of the same.

In both forms of the invention shown, an adjustable pressure regulator has been shown where the amount of oil passing through either primary or secondary lubricating system can be controlled as to pressure and amount passing therethru.

Corresponding and like parts are referred to in the following description and designated in the several views of the drawing by like reference characters.

In Figure 1, the numeral 1 illustrates the inlet of a conventional gear pump 2, which is driven by shaft 3. During the operation of the engine oil is drawn from the sump 4 and forced through conveyer pipe 5 to filter and sediment trap 6; thence through filtering medium 7 and outlet 8, to bearing manifolds 9, and to metering orifices 10, intermittently connected therewith.

As stated at certain intervals of the engine operation the oil manifolds 9, communicate with metering orifices and passages 10, said communication being established at times during the cycle of the engine operation when the opposite end of metering orifices and passages 10 are in communication with the unloaded side of the bearings, thus admitting a metered amount of filtered oil to the side of the bearings where the least amount of pressure can readily force the oil with a minimum of resistance and thus the oil can be more readily and evenly distributed on the bearings throughout the rest of the cycle of operations. It is well known that bearing clearances increase and decrease on opposite sides of the same in proportion to the engine speed and power developed by the engine, thus as pressures are generated on one side of the bearing due to the above condition, the oil film is decreased on the pressure side, and the clearance is increased on the opposite. It will be evident then that as orifices or passages 10 are in communication with the unloaded side of the bearing during their contact with the lubricant under pressure that the amount of lubricant delivered to the bearings is more directly proportional to the time and duration of contact of orifices 10 with the fluid under pressure in manifolds 9 and unloaded side of the bearings than by the pressure of the fluid alone on the bearings as is the case in conventional lubricating systems commonly used in the past which depend on increase or decrease of oil pressure for varying quantities of lubricant on the bearings.

As gear pump 2 in conventional engines is driven directly proportional to the engine revolutions, it generates an oil pressure in proportion to the engine speed. It will be evident, then, that metering orifices 10 and bearing clearances cannot readily convey away the oil in proportion to the pump speed. Therefore, as pressure between the pump and bearings increases, due to either engine speed or oil viscosity, adjustable by-pass arrangement 11 allows oil to escape from the pressure lubricating system and be distributed over the timing gears in the gear case and down through chamber 12 into distributing tube 13, where it flows out through orifices 14, into splash feed troughs 15, where connecting rod dippers 16 dip into the oil on each revolution of the engine constituting a splash system, delivering oil to the unloaded side of the bearings also. When the amount of oil delivered by regulating valve 11 exceeds the amount required by the splash system, an over-flow is provided at dotted line 17, where the excess oil over-flows from chamber 12 into sump 4 and is returned to the pump.

On Figure 2, numeral 18 illustrates a means of preventing oil pressure from the pressure lubricating system being discharged into the splash system, as the oil passage 10 can be arranged to be in communication with only the pressure or splash system separately and thereby prevent inter-communication of the two systems at the same moment, should this be desirable.

In Figure 3, a lubricating system is illustrated wherein 20 is a conventional gear pump arranged to draw oil from the sump 21 and force same under pressure through passage 22 to a filter and sediment trap 23; thence through manifold 24 to bearings, 25, 26, 27, 28, etc., of a hydro-carbon engine.

Conventional lubricating systems used in the past have had a tendency to over-oil the upper-most parts of the engine during slow speeds, and under-oil the same at high speeds. To prevent this over-oiling of the pistons, etc., at low speeds, metering orifices and passages 36 and 37 are arranged to communicate with orifice 38 alternately, providing a positive means of limiting the amount to each bearing, which thus prevents one bearing from obtaining more oil than another where bearing clearances are unequal, and also preventing a loose bearing from starving a tight one and throwing the excess oil upon the pistons, etc., where it is not required but causes trouble from carbon and is uneconomical.

During operation of the engine as the engine speed and the speed of the pump 20 increases and resistance through the filter and bearings is proportionately increased, primary by-pass arrangement 29 allows oil to enter distributor 30 and splash feed troughs 31, where it is picked up by dippers 32 and delivered to the unloaded side of the bearings. As the speed of the engine increases still further the secondary by-pass arrangement 33, adjustable if desired, allows oil to enter distributor 34 and be delivered through orifices 35 under pressure to the upper-most parts of the motor, thus lubricating and cooling cylinders, pistons, rings, wrist pins, connecting rods, etc., with a copious quantity of oil at the higher operating speeds of the engine. However, it is well known, that increased viscosity of the lubricating oil, due to temperature, etc., may produce the same results as high operating speeds of the engine, and thus the invention described herein provides a means of lubricating an engine during the starting periods in cold weather, etc., and prevents the burning out of bearings where oil is retarded in its delivery to said parts due to the supply from the conventional pressure lubricating system being inadequate to deliver oil to the upper-most parts of the engine during cold weather, or at high operating speeds, etc., and therefore, having described my invention, what I claim is:

1. In combination with a hydro-carbon engine, a lubricating system comprising a reservoir, parts to be lubricated, a means of forcing lubricant from the reservoir to said parts to be lubricated through independent lubricating systems, one a force feed system containing a means of filtering the lubricant passing therethru, and a means of metering the amount of lubricant to the parts to be lubricated in proportion to the load upon same, and the other a splash system operative by resistance of lubricant through the pressure system.

2. A lubricating system in combination with a hydro-carbon engine, comprising a means of drawing lubricant from a reservoir and forcing same through a filtering medium to the bearings of the engine under pressure, a means of delivering said lubricant to the unloaded side of said bearings in proportion to the speed and load upon same, and a secondary means of delivering lubricant to said bearings.

3. A lubricating system in combination with a hydro-carbon engine, comprising a means of drawing lubricant from a reservoir and forcing same through a filtering medium to the bearings of the engine under pressure, a means of delivering said lubricant to the unloaded side of said bearings in proportion to the speed and load upon same, and a secondary means of delivering lubricant to said bearings, said secondary means operated in conjunction with the first means.

4. A primary pressure lubricating system, containing a means of metering the amount of fluid to the parts to be lubricated by rotative conduits, in communication with fixed conduits, and a secondary lubricating system operative as a by-pass on said primary pressure lubricating system, serving to supply copious quantities of lubricant to lubricate and cool the parts to be lubricated and operated by resistance of lubricant through the primary lubricating system.

5. A primary pressure lubricating system, containing a filtering means, a means of metering the amount of fluid to the parts to be lubricated by rotative conduits in communication with fixed conduits, and a secondary lubricating system operative as a by-pass on said primary pressure lubricating system, serving to supply copious quantities of lubricant to lubricate and cool the parts to be lubricated operated by resistance of lubricant through the primary lubricating system.

6. A pressure lubricating system in combination with a hydro-carbon engine, comprising a lubricant reservoir, a means to force the lubricant from the reservoir through a filtering means to the parts to be lubricated, a means to resist the excess flow of lubricant in the primary lubricating system, and suitable by-pass arrangements on the pressure line of the primary lubricating system serving to relieve primary pressure system of excess pressure and divert the lubricant relieved from said primary pressure lubricating system to a secondary lubricating system.

7. In an engine, a primary pressure lubricating system, a secondary splash lubricating system, a connection for supplying oil from the primary to the secondary system and pressure responsive control means for said connection whereby said secondary system becomes effective only when the pressure in the primary system becomes excessive and again becomes ineffective when the pressure in the primary system is no longer excessive.

8. In an engine, a primary pressure lubricating system including a filter connected in series between a pump and bearings to be lubricated, a secondary normally ineffective lubricating system and a connection between the secondary system and the primary system adapted to supply oil to the former without passing through the filter and pressure responsive means controlling the connection whereby said secondary system becomes effective only when the pressure in the primary system becomes excessive and again becomes ineffective when the pressure in the primary system is no longer excessive.

9. In an engine, a primary pressure lubricating system, a secondary splash lubricating system adapted to be supplied with oil from the primary system and yielding control means preventing the flow to the secondary system except when overcome by pressure in the primary system.

10. In an engine, a primary pressure lubricating system including a filter in series between a pump and bearings, and an auxiliary lubricating system normally ineffective but rendered effective by pressure in the primary system and a third system rendered operative by a pressure responsive valve to supply oil directly to the skirts of the pistons when the pressure of the oil rises above a predetermined minimum.

11. In an engine, a primary pressure lubricating system including a filter in series between a pump and bearings, and a secondary lubricating system, a connection between the primary system in advance of the filter and the secondary system and a pressure responsive valve controlling said connection whereby the secondary system is ineffective unless the pressure in the primary system exceeds a selected amount.

12. In an engine, a primary pressure lubricating system including a relief valve adapted to open when the pressure in the primary system exceeds a selected amount and a secondary splash lubricating system supplied by oil escaping from the primary system when the relief valve is open.

13. In an engine of the type including a crank shaft journaled in main bearings in a crank case, cylinders, pistons in the cylinders, connecting rods between the pistons and the crank shaft and a primary pressure lubricating system, the combination of a secondary lubricating system including a distributing header, a connection between the header and the primary lubricating system and a pressure responsive valve solely controlling the connection and adapted to be opened by pressure in the primary system.

14. In an engine of the type including a crank shaft journaled in main bearings in a crank case, cylinders, pistons in the cylinders, connecting rods between the pistons and the crank shaft and a primary pressure lubricating system, the combination of a secondary lubricating system including a splash receptacle in the crank case, a connection between the receptacle and the primary system and a pressure responsive valve in the connection adapted to be opened by pressure in the primary system.

15. In an engine, a primary pressure lubricating system, a secondary splash lubricating system and control means tending to render the secondary system inoperative and yielding to excess pressure in the primary system to render the secondary system operative.

16. In an engine, of the type including a crank shaft journaled in main bearings in a crank case, cylinders, pistons in the cylinders, connecting rods between the pistons and the crankshaft and a primary pressure lubricating system, the combination of a secondary lubricating system including a distributing header adjacent to the cylinders, a splash receptacle below the crank shaft, connections between the distributing header and the splash receptacle on the one hand and the primary lubricating system on the other, and pressure responsive valves controlling each connection and adapted to be opened by pressure in the primary lubricating system.

17. A lubricating system for internal combustion engines comprising a pump, a conduit for conducting lubricant from said pump, means for supplying said lubricant to the pistons and bearings of said engine from said conduit, and means for supplying lubricant to said pistons independently of said first-named means when the pressure in said conduit rises above a predetermined maximum.

18. In combination, an internal combustion engine having pistons, a crank shaft operated by said pistons, bearings for said crank shaft and an oil sump for containing lubricating oil, an oil pump, a discharge passage for said pump, means for supplying oil from said passage to said pistons and bearings, and independent means for supplying oil to said pistons from said passage when the pressure therein exceeds a predetermined maximum.

19. In combination, an internal combustion engine having pistons, bearings and a crank case for containing lubricating oil, an oil pump within said case, a header, conduits leading from said header to said bearings for supplying oil thereto, a discharge passage through which oil is supplied to said header from said pump, and an auxiliary passage leading from said passage for supplying oil directly to said pistons, and a pressure valve for controlling the flow of oil from said passage into said auxiliary passage.

20. A lubricating system for internal combustion engines comprising a main lubricant supplying system, and auxiliary lubricant supplying system, and means for preventing the operation of said auxiliary system when the pressure in said main system is below a predetermined minimum.

21. A hydrocarbon engine having an oil reservoir, a pump, a filter, and a primary system for distributing oil to the moving parts of the engine, connected in series, said system having all conduits within said engine and filter, a secondary lubricating system for supplying oil to the moving parts of the engine connected to inlet side of the filter and a pressure operated by-pass valve responsive to a rise of pressure in the first system for diverting the oil into the second system and thereby preventing excessive pressure in the first system from driving dirt through the filter.

22. A hydrocarbon engine having an oil reservoir, a filter, a primary lubricating system connected with the outlet side of the filter supplying oil to the moving parts of the engine, a secondary lubricating system for supplying oil to the moving parts of the engine connected to inlet side of the filter, and a valve operated by pressure in the primary lubricating system for relieving the pressure therein and diverting the oil into the second system, thereby preventing a clogged filter from cutting off the oil supplied to the moving parts, all conduits for said systems being within said engine and filter.

23. A hydrocarbon engine having a reservoir for lubricant, a filter arranged to purify the lubricant on its passage to the bearings of the engine, conduits within said engine and filter adapted to convey the purified lubricant from the filter to the bearings at a point opposite to the pressure thereon, means including a second set of conduits for lubricating said bearings and a valve operated by a rise in pressure in the first conduit system to control the flow of lubricant in the second system.

24. A lubricating system for internal combustion engines, comprising a system for lubricating the pistons and bearings of said engine, an independent oiling system arranged to conduct oil to the pistons of the engines and means responsive solely to pressure in the first system to render the second system operative, both of said systems being within said filter and the crankcase of said engine.

25. In combination, an internal combustion engine having a crankcase, a crank shaft and bearings therefor within said case, a primary lubricating system for oiling said bearings, said system comprising a pump within said casing, a filter member mounted on said casing and in direct thermal contact therewith, an inlet and outlet for said filter member, a filter element between said inlet and outlet, a passage integral with said case for conducting oil from said pump directly into said inlet without the use of extraneous pipes, a passage integral with said case leading directly from said outlet to said bearings and a secondary lubricating system for lubricating said bearings when the pressure within said primary system exceeds a predetermined maximum.

26. In combination, an internal combustion engine having a crankcase, a crank shaft and bearings therefor within said case, a lubricating system for oiling said bearings, said system comprising a pump within said casing, a filter member mounted on said casing and in direct thermal contact therewith, an inlet and an outlet in the base of said filter, a filter element between said inlet and outlet, a passage in the wall of said case through which oil is conducted from said pump to said intake, a passage for conducting oil from said outlet through the wall of said case to said bearings and a pressure relief valve in said system for relieving the pressure therein when the pressure in said system rises above a predetermined amount.

27. In combination, an internal combustion engine comprising a crankcase, a crank shaft therein and bearings for said crank shaft, a lubricating system for lubricating said bearings, said system comprising a pump, a filter associated with said crankcase in direct thermal contact therewith, a passage for conducting oil from said pump to said filter, a passage for conducting filtered oil from said filter to said bearings for lubricating the same, and supplemental means for lubricating said bearings when the pressure in said first named passage rises above a predetermined maximum, said passages and means being within the confines of said crankcase and filter whereby undue cooling of the oil will be prevented during its passage to and from the filter.

28. In combination, an internal combustion engine having a crankcase, bearings for said engine within said case, a filter having its lower portion rigid with said crankcase whereby heat is readily conducted from said case to said filter, a hollow filter element within the upper portion of said filter and an oil sump in the lower portion thereof, an oil pump associated with said crankcase, a pump discharge passage extending upwardly within said filter exteriorly of said filter element for conducting oil from said pump and discharging the same into said filter above the level of said sump whereby impurities from said oil will settle in said sump, means for conducting filtered oil from the interior of said filter element to said bearings and means for passing the oil around said filter element when the pressure therein rises above a predetermined maximum.

29. In combination, an internal combustion engine, a crankcase for said engine, bearings for said engine within said crankcase, a filter comprising a base and a casing detachably connected to said base, said base being rigid with said crankcase, a hollow filter element within said filter, an oil pump within said crankcase, a pump discharge passage within said engine, a pipe secured in said passage and extending within said filter above the base thereof exterior of said filter element and terminating below said filter element, a lubricating passage for conducting filtered oil from the interior of said filter element to said bearings, and means for lubricating said bearings with unfiltered oil from said pump discharge passage when the resistance to the flow of oil through said filter rises above a predetermined maximum.

30. In combination, an internal combustion engine having a crankcase, a crankshaft and bearings therefor within said case, a lubricating system for oiling said bearings, said system comprising a pump associated with said crankcase, a filter comprising a casing on the side of said crankcase and in direct thermal contact therewith, an inlet passage and an outlet passage in the base of said filter casing, a filter element within said casing between said inlet and outlet passages, above said base, a passage through which oil is conducted from said pump to said intake, a passage for conducting oil from said outlet to said bearings and a pressure relief valve in said system for relieving the pressure therein when the pressure in said system rises above a predetermined amount, said passages being within the confines of said crankcase and filter whereby undue cooling of the oil will be prevented during its passage to and from the filter.

31. In combination, an internal combustion engine having a crankcase, bearings for said engine within said case, a filter member in thermal contact with said case, a sump in the lower portion of said member, a filter element within said member, a pump, a discharge passage for conducting oil from said pump to said filter member and discharging the same into said member on one side of said element a substantial distance above said sump, a lubricating passage for conducting filtered oil from the other side of said element to said bearings and means for conducting said oil from said pump discharge passage to said crankcase around said filter element when the resistance to the passage through said element rises above a predetermined amount, all of said passages and means being within said filter and crankcase, whereby the radiation of heat from said oil is reduced to a minimum.

In testimony whereof I affix my signature.

CHARLES A. WINSLOW.